DEFLECTION SIGNAL CORRECTION SYSTEM

Filed Nov. 29, 1968 2 Sheets-Sheet 1

INVENTOR.
MARTIN C. HENDERSON
BY Lindenberg & Freilich
ATTORNEYS

INVENTOR.
MARTIN C. HENDERSON
BY
Lindenberg & Freilich
ATTORNEYS

United States Patent Office 3,501,669

Patented Mar. 17, 1970

3,501,669

DEFLECTION SIGNAL CORRECTION SYSTEM

Martin C. Henderson, Canoga Park, Calif., assignor to The Bunker-Ramo Corporation, Canoga Park, Calif., a corporation of Delaware Filed Nov. 29, 1968, Ser. No. 779,901
Int. Cl. H01j 29/70
U.S. Cl. 315—18 5 Claims

ABSTRACT OF THE DISCLOSURE

A system for correcting for inaccuracies in the positioning of a cathode ray tube beam which inaccuracies may result from various factors including (1) curvature of the screen and (2) off-axis displacement of the electron gun. Unique analog multiplication means are disclosed for developing corrected deflection signals in response to position command signals in order to compensate for distortions which would otherwise be introduced due to the tube geometry.

BACKGROUND OF THE INVENTION

Field of the invention

This invention relates generally to display apparatus, as for example of the cathode ray tube (CRT) type, and more particularly to means for correcting for inaccuracies in the positioning of a CRT beam.

In uncorrected CRT display systems, the coordinates of points displayed on the CRT screen do not precisely correspond to the intended coordinates as expressed by position command signals. A number of identifiable factors contributing to this distortion include the following:

(1) Deflection yokes tend to produce angular deflection which increases faster than uncorrected deflection currents for large deflections;

(2) The shape of the CRT screen normally introduces distortion inasmuch as the smaller the radius of screen curvature, the smaller the linear deflection produced for a given angular deflection;

(3) The electron gun may be displaced from the axis of the screen. It may, for instance, be deliberately displaced from the axis to provide clearance for an optical port on the screen axis;

(4) The beam may not be aimed accurately at the center of the display area; and (5) The deflection coils may not be precisely displaced by 90°.

Theoretical analysis of these distortions indicate several components. The principal error components in the X axis caused by the aforementioned yoke deflection factor (1) are proportional to $X^3$ and $Y^2X$. Higher order components are proportional to $X^5$, $X^3Y^2$, $Y^4X$ etc.

An electron gun displaced from the X axis will primarily introduce errors related to XY in the X direction and related to $Y^2$ in the Y direction. The relative magnitude and sense of the errors depend on the direction and magnitude of gun displacement. The gun displacement factor also influences the magnitude of the error components introduced by the other distortion causing factors. Non-perpendicular coils (factor (5)) introduce Y related errors into the X deflection. Corresponding error components will be introduced into the Y deflection.

To summarize, distortion of a CRT pattern occurs as a result of several causes. The principal distortion components in X are proportional to Y, XY, $X^2$, $Y^2$, $X^3$, $Y^2X$. Principal distortion components in Y are proportional to X, XY, $X^2$, $Y^2$, $Y^3$ and $X^2Y$. Higher order components are undoubtedly present but typically are not readily observed.

DESCRIPTION OF THE PRIOR ART

In many known prior art systems, attempts have been made to correct for various positioning distortions. For example, some such systems have incorporated means for producing magnetic fields in the drift space of the CRT following the deflection coils. This technique permits a fair correction to be achieved for certain types of distortion. However, the correction is achieved at the expense of added nonlinearity.

A further correction technique is disclosed in U.S. patent application, Ser. No. 610,614, filed Jan. 20, 1967, by Carl A. Eggert and assigned to the assignee of the present invention. The system disclosed therein uses an analog multiplier circuit to produce a principal XY correction to the X signal in a CRT having the electron gun displaced in the Y direction only, together with nonlinear diode resistor and absolute value circuits to produce compensations for other observable distortions and for imperfections in the multiplier.

SUMMARY OF THE INVENTION

The present invention is directed to an improved system responsive to position command signals for developing deflection signals corrected so as to compensate for various distortions introduced as a consequence of several diverse factors. In accordance with the invention, the corrected deflection signals are developed by summing various correction signal components produced by a multiplication process involving the position command signals.

In accordance with a first aspect of the invention, variable means are provided to permit individual adjustment of various correction signal components to thus enable each significant distortion component to be compensated for and substantially eliminated. The number of correction signal components used depends upon the precision desired. Any correction term of the form $KX^mY^n$ may be synthesized and added into the appropriate position command signal to develop a corrected deflection signal.

In accordance with a further significant aspect of the invention, unique circuitry is provided for performing analog multiplication. Briefly, in accordance with this aspect of the invention, the product of two analog quantities is developed by interconnecting first and second differential circuits such that the distribution ratio is the same in the second circuit as it is in the first circuit and by causing the first analog quantity to determine the distribution ratio between the paths of the first circuit and the second quantity to determine the total flow in the second circuit whereby the quantitative difference between the flows in the second circuit will represent the product of the analog quantities.

Although the display system embodiment disclosed herein specifically provides only for the correction of major horizontal and vertical position command signals, it will be readily appreciated by those skilled in the art, that the teachings of the invention can be extended to correct minor positioning signals as well.

Figure 1:
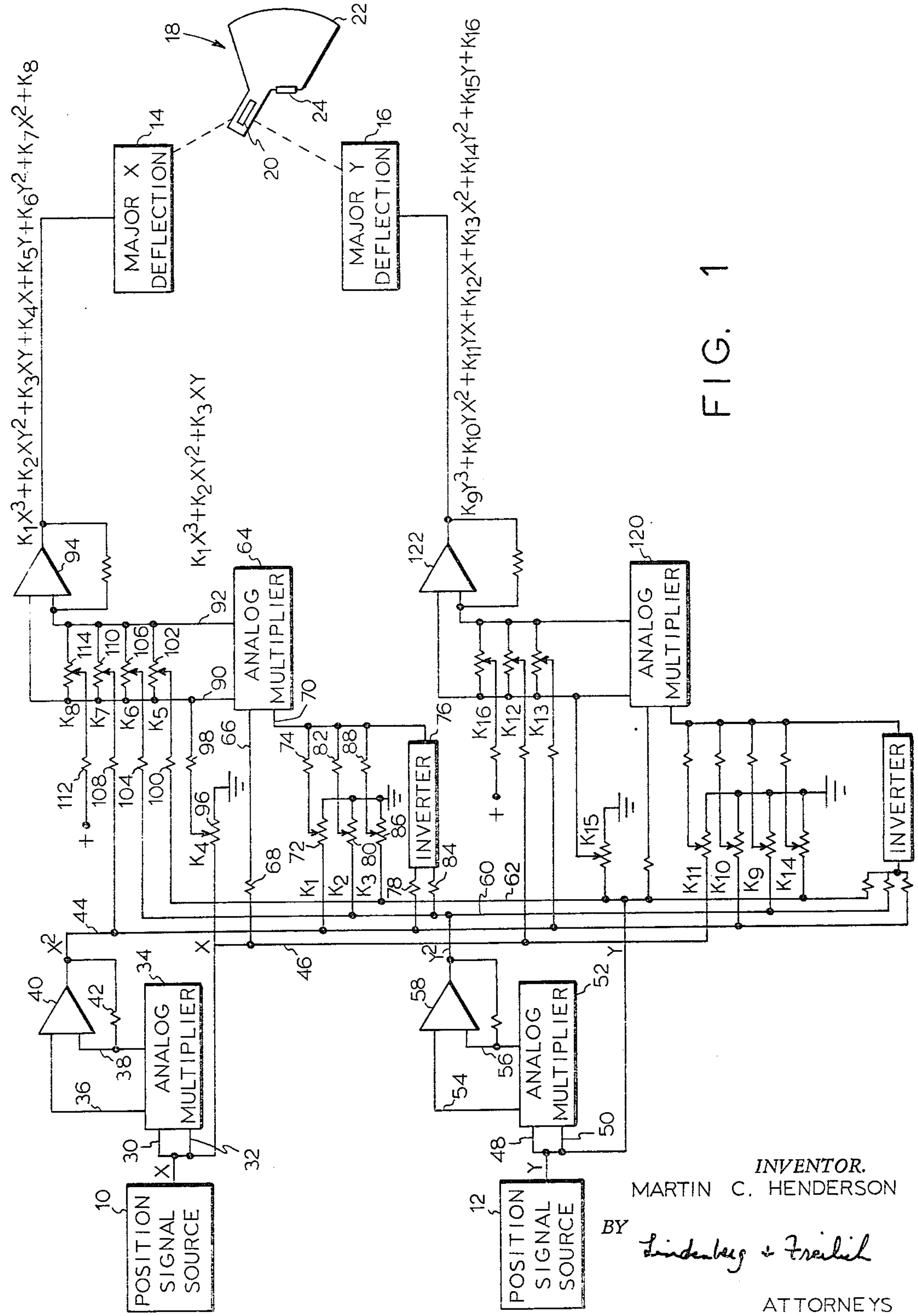
FIGURE 1 is a schematic block diagram of a system for correcting positioning signals in a CRT display system.

It has been pointed out that the coordinates of points displayed on a cathode ray tube screen will not correspond precisely to the intended coordinate as expressed by position command signals, unless some type of correction is introduced. In accordance with the present invention, a correction apparatus as illustrated in FIG. 1, is interposed between a source of horizontal (X) and vertical (Y) position command signals and the cathode ray tube deflection means to compensate for various factors tending to introduce beam position distortion.

The beam position distortion eliminated by embodiments of the present invention is attributable to many different factors. For example, the shape of the cathode ray tube screen normally introduces distortion since its radius of curvature is usually different from the distance between the beam deflection means and the tube screen. This distortion is usually referred to as pincushion distortion and is explained in somewhat greater detail in the aforecited patent application.

Beam position distortion may also be caused, for example, by the electron gun being displaced from the axis of the tube screen. This off-axis displacement may be deliberate in order, for example, to provide for an optical port in the tube envelope on the screen axis. The distortion attributable to the gun being off-axis is sometimes referred to as keystone distortion and is also described in somewhat greater detail in the aforecited patent application.

Beam position distortion is also attributable to many other factors. However, regardless of the particular distortion factors prevalent in a particular cathode ray tube, it has been found that the magnitude of the beam position distortion at any position on the cathode ray tube screen is related to the X and Y coordinates at that position. More particularly, the magnitude of beam position distortion at any coordinate can be expressed in the form $KX^mY^n$.

In accordance with the present invention, correction apparatus is provided for interposition between a source of position command signals and the cathode ray tube deflection means to add (or subtract) correction terms to the position command signals to develop deflection signals for application to the tube deflection means. The number of correction terms superimposed on the position command signals depends upon the precision desired. In accordance with the invention any correction term of the form $KX^mY^n$ may be synthesized and combined with the position command signal to develop a corrected deflection signal.

In accordance with the preferred embodiment of the invention illustrated in FIG. 1, the following distortion components in X are compensated for: Y, XY, $X^2$, $Y^2$ $X^3$, and $Y^2X$. The following distortion components in Y are compensated for: X, XY, $X^2$, $Y^2$, $Y^3$, and $X^3Y$. Although the teachings of the present invention can be easily extended to compensate for higher order distortion components, the dsitortion attributable thereto is not usually visually observable.

Attention is now called to FIG. 1 of the drawings which illustrates a preferred embodiment of the invention for correcting X and Y beam position command signals respectively provided by sources 10 and 12 to develop corrected X and Y deflection signals for application to deflection means 14 and 16 associated with cathode ray tube 18. The cathode ray tube 18 illustrated in FIG. 1 is of the type discussed in the aforecited patent application wherein the electron gun 20 is displaced from the X axis of screen 22 in order to enable an optical port 24 to be formed in the tube envelope on the screen axis. The optical port 24 enables images to be optically projected onto the screen 22 from the rear.

Prior ot proceeding with a detailed discussion of the apparatus illustrated in FIG. 1, it is pointed out that the illustrated embodiment was designed specifically to compensate for the principal distortion factors present in a cathode ray tube of the type illustrated in FIG. 1 in which the electron gun is displaced from the X axis and symmetric with respect to the Y axis. Inasmuch as different types of distortion will be present in different tubes, it is recognized that it may be necessary to somewhat modify the embodiment of FIG. 1 for use with different tubes. Regardless of the tube type, however, it is emphasized that embodiments of the invention are able to synthesize any correction terms of the form $KX^mY^n$ and it is accordingly pointed out that embodiments of the invention are useful with any cathode ray tube to eliminate the principal distortion factors encountered therein.

In considering the embodiment of FIG. 1 in detail, initial attention will be paid to the correction terms superimposed upon the X position command signal provided by source 10. The signal X is applied to first and second input terminals 30 and 32 of an analog multiplier 34 to be described in greater detail in conjunction with FIG. 2. The multiplier 34 forms a product of the analog signals supplied to the input terminals 30 and 32 thereof and, as will be seen hereinafter, represents the product as the difference between the currents flowing through output terminals 36 and 38. Terminals 36 and 38 are connected to the input terminals of an operational amplifier 40 which is responsive to the difference between the currents through terminals 36 and 38, to develop a signal $X^2$ at its output terminal. As with all operational amplifiers, a feedback resistor 42 is connected between the amplifier output terminal and one of its input terminals.

The signal $X^2$ provided by operational amplifier 40 is applied to a bus wire 44. The X signal provided by source 10 is applied to a bus wire 46.

The signal Y provided by source 12 is coupled to both input terminals 48 and 50 of an analog multiplier 52, identical to the multiplier 34. The output terminals 54 and 56 of the multiplier 52 are coupled to an operational amplifier 58 which provides an output signal $Y^2$ which is supplied to bus wire 60. The signal Y is supplied to bus wire 62.

A further analog multiplier 64, preferably identical to the multipliers 34 and 52, is provided to develop signals which are functions of $X^3$. The first terminal 66 of multiplier 64 is coupled through a sealing resistor 68 to the X bus wire 46. A signal constituting the sum of variable portions of signals $X^2$, $Y^2$ and Y is coupled to the input terminal 70 of multiplier 64. More particularly, the $X^2$ bus wire 44 is connected to a potentiometer 72 with the slide contact thereof being connected through a sealing resistor 74 to the input terminal 70. Thus, by moving the slide contact of the potentiometer 72, a selected portion $K_1$ of one polarity of the signal $X^2$ can be applied to the terminal 70. Inasmuch as it may be desired for the component $X^2$ to the either positive or negative, the $X^2$ bus wire 44 is also connected to an inverter 76 through resistor 78. The output of inverter 76 is summed into the signal applied to input terminal 70. The $Y^2$ bus wire 60 is connected to potentiometer 80, defining factor $K_2$, with the slide contact thereof connected through a resistor 82 to the terminal 70. The $Y^2$ bus wire 60 is also connected through resistor 84 to the inverter 76 to thus permit either polarity $Y^2$ signal to be applied to the terminal 70. The Y bus wire 62 is connected to potentiometer 86, defining factor $K_3$, with the slide contact thereof being connected to terminal 70 through a resistor 88.

The analog multiplier 64 will produce currents at the output terminals 90 and 92 thereof whose difference is related to the function $K_1X^3+K_2XY^2+K_3XY$. The terminals 90 and 92 are connected to the input terminals of an operational amplifier 94. Additional correction signal components are summed with the function produced at the output of the multiplier 64. More particularly, the X signal available on bus wire 46 is applied to potentiometer 96, defining factor $K_4$, with the slide contact thereof being connected through resistor 98 to terminal 90. The Y bus wire 62 is connected through resistor 100 to the slide contact of potentiometer 102, defining factor $K_5$, connected between terminals 90 and 92. Similarly, the $Y_2$ bus wire 60 is connected through resistor 104 to the slide contact of potentiometer 106, defining factor $K_6$, connected between terminals 90 and 92. Additionally, the $X_2$ bus wire is connected through resistor 108 to the slide contact of potentiometer 110, defining factor $K_7$, connected across terminals 90 and 92. Still further, a positive potential source is connected through resistor 112 to the slide contact of potentiometer 114, defining factor $K_8$, connected across terminals 90 and 92.

In view of the explanation thus far, it should be apparent that the operational amplifier 94 will produce the function depicted in FIG. 1 at its output terminal. That is, the output of operational amplifier 94 will consist of the original positioning signal X together with several correction components, each including a variable K term whose magnitude is determined by one of the aforementioned potentiometers. The composite output signal provided by amplifier 94 constitutes the corrected X deflection signal which is applied to the deflection means 14.

It should be appreciated that each of the potentiometers thus far discussed can vary the magnitude of one of the signal correction components in the corrected deflection signal to thus enable precise correction of the beam position. For identification purposes, the following listing identifies the K terms controlled by each of the indicated potentiometers:

| Potentiometer: | K term |
|---|---|
| 72 | $K_1$ |
| 80 | $K_2$ |
| 86 | $K_3$ |
| 96 | $K_4$ |
| 102 | $K_5$ |
| 106 | $K_6$ |
| 110 | $K_7$ |
| 114 | $K_8$ |

FIG. 1 also illustrates the signal components developed to correct the Y positioning signal. Inasmuch as the development of the Y signal correction components is very similar to the development of the X signal components, it is not considered necessary to explain the implementation of the Y channel in detail. Suffice it to say that the analog multiplier 120 develops a product signal comprised of a $Y^3$ term which is supplied to an operational amplifier 122 which yields the Y positioning signal together with several correction signal components as illustrated in FIG. 1.

As should be appreciated from the foregoing, inclusion of the various potentiometers illustrated in FIG. 1, enables each of the correction signal components to be individually adjusted to thus enable a technician to precisely compensate out any causes of beam positioning errors. It is pointed out that although the outputs of amplifiers 94 and 122 illustrated in FIG. 1 are shown as being connected to the major X and Y deflection means, the apparatus of FIG. 1 can also be employed to eliminate minor positioning errors, as is discussed in the aforecited patent application.

Figure 2:
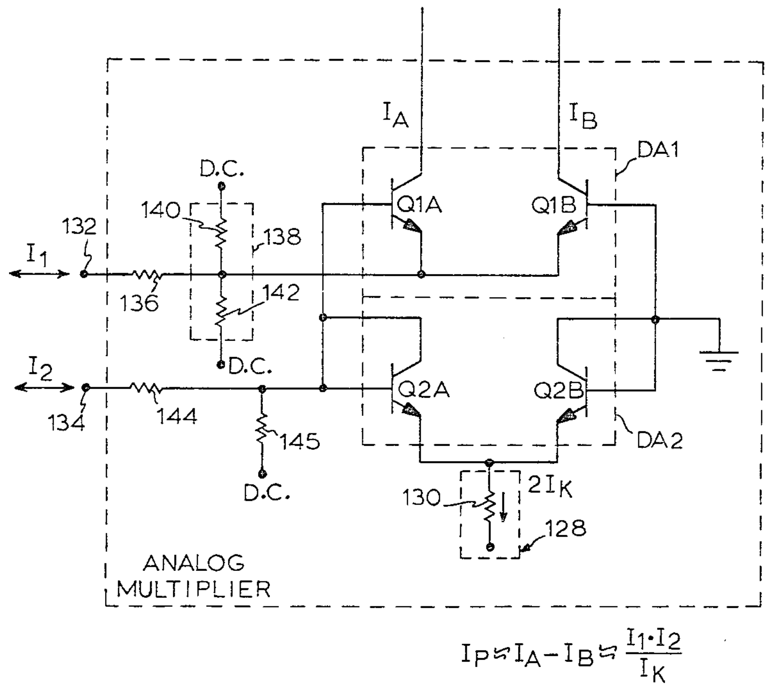
FIG. 2 is a schematic diagram of an analog multiplier constructed in accordance with the present invention.

Attention is now called to FIG. 2 of the drawing which illustrates a preferred analog multiplier embodiment suitable for use in the apparatus of FIG. 1. The multiplier of FIG. 2 is comprised of first and second differential devices, for example differential amplifiers. More particularly, a first differential amplifier DA1 is provided which is comprised of a pair of similar transistors Q1A and Q1B. The second differential amplifier DA2 is comprised of similar transistors Q2A and Q2B.

The emitters of transistors Q2A and Q2B are connected together and to an essentially constant current source 128 providing a signal $2I_K$. The current source 128 can comprise a very high resistance 130 connected to a source of negative DC potential. The collector of transistor Q2A is connected to the base thereof and similarly the collector of transistor Q2B is connected to the base thereof. The base of transistor Q2A is connected directly to the base of transistor Q1A and the base of transistor Q2B is connected directly to the base of transistor Q1B. The bases of transistors Q1B and Q2B are connected to a source of DC reference potential, e.g. ground.

In accordance with the invention, first and second analog input currents $I_1$ and $I_2$ are respectively applied to the multiplier input terminals 132 and 134. Input terminal 132 is connected through a resistor 136 and a biasing offset circuit 138 to the commonly connected emitters of transistors Q1A and Q1B. The biasing circuit 138 is comprised of resistors 140 and 142 respectively connected between the common emitter connection of transistors Q1A and Q1B and different sources of DC bias. The purpose of the biasing circuit is to permit circuit operation with input signals $I_1$ of either polarity. The input terminal 134 is connected through a resistor 144 and a biasing resistor 145 to the base of transistor Q2A. The purpose of resistor 145, as will be seen, is to provide a current $I_K$ in the absence of an input current $I_2$ and to thus permit the circuit to operate with either polarity of current $I_2$.

As will be demonstrated hereinafter, the multiplier of FIG. 2 develops the product of the analog input signals $I_1$ and $I_2$ applied thereto and represents the product as the difference between the collector currents $I_A$ and $I_B$ in transistors Q1A and Q1B respectively. Mathematically, it will be shown that $$I_p=I_A-I_B=\frac{I_1 \cdot I_2}{I_K}$$

The principal of operation of the multiplier circuit of FIG. 2 is based on the concept of establishing a current distribution ratio in the paths of the differential amplifier DA2 which is dependent on the magnitude of the current $I_2$. The total current through the paths of differential amplifier DA2 is fixed at $2I_K$ by the constant current source 128. By interconnecting the bases of transistors Q2A and Q2B directly to the bases of transistors Q1A and Q1B respectively, the same current distribution ratio will be established in differential amplifier DA1 as is established in differential amplifier DA2. The total current flow through the paths of differential amplifier DA1, however, is determined by the analog input signal $I_1$ and accordingly the difference in the collector current $I_A$ and $I_B$ is proportional to the product of input signals $I_1$ and $I_2$.

In order to better understand the operation of the multiplier of FIG. 2, consider initially that the current $I_2$ is equal to zero. Accordingly, the constant current $2I_K$ will divide evenly between the transistors Q2A and Q2B so that each transistor handles a current $I_K$. The introduction of the analog input current $I_2$ to the collector of transistor Q2A increases the collector current of transistor Q2A to $I_K+I_2$. The collector current in transistor Q2B will then be represented by $I_K-I_2$. The difference in the collector currents through transistors Q2A and Q2B forced by the introduction of the analog input current $I_2$ will establish voltages at the bases of transistors Q2A and Q2B at a level required to produce the indicated current division. Since the base voltages at transistors Q1A and Q1B are the same as the base voltages established at transistors Q2A and Q2B, the analog input current $I_1$ furnished to the emitters of transistors Q1A and Q1B will divide in the same ratio. The change in collector currents $I_A$ or $I_B$ from $I_1/2$ is thus proportional to $I_2$ and the proportion being the same for any $I_1$, the current change must be proportional to the product $I_1 \times I_2$. The difference between collector currents $I_A$ and $I_B$ can be readily sensed by a differential operational amplifier with a reasonable common mode rejection capability as shown in FIG. 1. Thus the operational amplifier output represents the product of the two input currents and a factor dependent on $I_K$.

The operation of the multiplier of FIG. 2 can be more rigorously demonstrated by the following brief and somewhat approximate mathematical treatment.

In a pair of similar transistors with common emitters supplied current from a high impedance source, let $I_e$ be the sum of the collector currents and $I_P$ be the difference between the collector currents. Now for junction transistors over a considerable current range, the collector current is an exponential function of the base to emitter voltage, thus for either transistor of the pair $$I_c=\frac{I_e}{2}e^{K(VBE-VBEO)} \tag{1}$$

Where VBEO is the base to emitter potential required to make the collector current equal to ½ the sum, or in other words, to make both collector currents equal.

One collector current is represented by $(I_e/2+I_P/2)$ while the other is represented by $(I_e/2-I_P/2)$.

The ratio of the two currents, i.e., $$\frac{I_e+I_p}{I_e-I_p}$$

is equal to $$\frac{I_e+I_p}{I_e-I_p}=\frac{e^{K(VBEA-VBEOA)}}{e^{K(VBEB-BVEOB)}}$$

which can be expressed as:

$$\frac{I_e+I_p}{I_e-I_p}=e^{K(VBEA-VBEB+VBEOB-VBEOA)} \tag{2}$$

For convenience, let the exponent of $e$ in Equation 2 be denoted by $2\mu$, then Equation 2 may be written: ($\mu$ is seen to have 2 components, the VBEO terms representing the offset between transistors and the VBE terms representing the actual potential difference between bases). Thus, $$\frac{I_e+I_p}{I_e-I_p}=e^{2\mu} \tag{3}$$

Solving for $I_p$ $$I_p=I_e\left(\frac{e^{2\mu}-1}{e^{2\mu}+1}\right)=I_e\left(\frac{e^{\mu}-e^{-\mu}}{e^{\mu}+e^{-\mu}}\right)=I_e \tanh \mu \tag{4}$$

This relation holds for both transistor pairs in the multiplier. Because of the collector to emitter feedback the second differential amplifier DA2 develops base to base voltage which is expressed by $$\mu=\text{arc tanh } x \text{ where } x=\frac{2I_2}{2I_K}=\frac{I_2}{I_K}$$

The first differential amplifier DA1 then produces an output $I_P$ given by $$I_p=I_1 \tanh \mu=\frac{I_1I_2}{I_K} \tag{5}$$

Equation 5 shows that the product signal $I_P$ is a function of three variables, i.e., $I_1$, $I_2$, and $I_K$. $I_1$ and $I_2$ of course constitute the analog input factors. Equation 5 suggests that if $I_K$ is also varied, maintaining the $I_K/2I_K$ ratio, division by $I_K$ is achieved. This may be done by controlling voltages across fixed resistors so that the voltages vary but remain in the same proportion. Inclusion of this division capability is significant inasmuch as it enables gain to be remotely controlled.

From the foregoing, it should be appreciated that an improved apparatus has been disclosed herein for processing CRT beam positioning signals to develop corrected deflection signals for application to the deflection means of a CRT. Additionally, a very useful analog multiplier circuit has been disclosed which is particularly suited for use in the apparatus for correcting the beam positioning signals.

The embodiments of the invention in which an exclusive property or privilege is claimed are defined as follows:

1. Apparatus useful in combination with a cathode ray tube for developing corrected vertical and horizontal deflection signals in response to uncorrected vertical and horizontal positioning signals so as to minimize beam position distortion, said apparatus comprising:
- first analog multiplication means for forming an analog signal $X^2$ from an analog signal X;
- second analog multiplication means for forming an analog signal $Y^2$ from an analog signal Y;
- third analog multiplication means having first and second input terminals for forming the product of analog signals applied thereto;
- means applying said analog signal X to said third analog multiplication means first input terminal;
- means coupling said analog signals $X^2$ and $Y^2$ formed by said first and second analog multiplication means to said third analog multiplication means second terminal and including means for individually varying the portions of said signals $X^2$ and $Y^2$ applied to said third analog multiplication means;
- fourth analog multiplication means having first and second input terminals for forming the product of analog signals applied thereto;
- means applying said analog signal Y to said fourth analog multiplication means first terminal; and
- means coupling said analog signals $X^2$ and $Y^2$ formed by said first and second analog multiplication means to said fourth analog multiplication means second terminal.

2. In a display system including a cathode ray tube having horizontal and vertical deflection means and sources of X and Y analog beam positioning signals, correction means responsive to said analog positioning signals for developing horizontal and vertical deflection signals for application to said horizontal and vertical deflection means, respectively, said correction means comprising:
- means for forming a plurality of analog correction signals each proportional to a different function of the form $KX^mY^n$ and at least including signals proportioned to $K_1X^3$, $K_2Y^3$, and $K_3XY$;
- means for summing selected ones of said analog correction signals with said X analog signal to develop a horizontal deflection signal;
- means for summing selected ones of said analog correction signals with said Y analog signal to develop a vertical deflection signal;
- means coupling said horizontal deflection signal to said horizontal deflection means; and
- means coupling said vertical deflection signal to said vertical deflection means.

3. In a display system including a cathode ray tube having horizontal and vertical deflection means and sources of X and Y analog beam positioning signals, correction means responsive to said analog positioning signals for developing horizontal and vertical deflection signals for application to said horizontal and vertical deflection means, respectively, said correction means comprising:
- a first analog multiplication means responsive to said X analog signal for forming an analog signal $X^2$;
- a second analog multiplication means responsive to said Y analog signal for forming an analog signal $Y^2$;
- a third analog multiplication means responsive to said X analog signal and to a sum signal formed of said analog signals $X^2$ and $Y^2+Y$ for developing a product signal $X^3+XY^2+XY$;
- a fourth analog multiplication means responsive to said Y analog signal and to a sum signal formed of said analog signals $X^2$ and $Y^2+X$ for developing a product signal $Y^3+YX^2+XY$;
- means coupling said product signal $X^3+YX^2+XY$ to said horizontal deflection means; and
- means coupling said product signal $Y^3+YX^2+XY$ to said vertical deflection means.

4. The system of claim 3 wherein said means coupling said product signal $X^3+XY^2+XY$ to said horizontal deflection means includes means for summing therewith at least portions of some of said signals $X^2$, $Y^2$, X and Y.

5. In a display system including a cathode ray tube having horizontal and vertical deflection means and sources of X and Y analog beam positioning signals, correction means responsive to said analog positioning signals for developing horizontal and vertical deflection signals for application to said horizontal and vertical deflection means, respectively, said correction means comprising:

a first analog multiplication means responsive to said X analog signal for forming an analog signal $X^2$;

a second analog multiplication means responsive to said Y analog signal for forming an analog signal $Y^2$;

a third analog multiplication means responsive to said X analog signal and to a sum signal formed of said analog signals $X^2$ and $Y^2$ for developing a product signal $X^3+XY^2$;

a fourth analog multiplication means responsive to said Y analog signal and to a sum signal formed of said analog signals $X^2$ and $Y^2$ for developing a product signal $Y^3+YX^2$;

means coupling said product signal $X^3+XY^2$ to said horizontal deflection means;

means coupling said product signal $Y^3+YX^2$ to said vertical deflection means; and means for individually varying the portions of the said analog signals $X^2$ and $Y^2$ included in said sum signal to which said third analog multiplication means is responsive.

References Cited

UNITED STATES PATENTS

| | | | |
|---|---|---|---|
| 2,831,145 | 4/1958 | Albert et al. | 315—24 |
| 3,422,305 | 1/1969 | Infante | 315—24 |
| 3,422,306 | 1/1969 | Gray | 315—24 X |

RODNEY D. BENNETT, Jr., Primary Examiner

T. H. TUBBESING, Assistant Examiner

U.S. Cl. X.R.

315—24, 26